(12) United States Patent
Presley

(10) Patent No.: US 6,418,247 B1
(45) Date of Patent: Jul. 9, 2002

(54) FIBER OPTIC SWITCH AND ASSOCIATED METHODS

(75) Inventor: Harry Wayne Presley, Malabar, FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/657,724

(22) Filed: Sep. 8, 2000

(51) Int. Cl.[7] .................................................. G02B 6/42
(52) U.S. Cl. .............................. 385/18; 385/16; 385/33
(58) Field of Search ............................. 385/18, 16–24, 385/33–37

(56) References Cited

U.S. PATENT DOCUMENTS

| | | | |
|---|---|---|---|
| 4,378,144 A | 3/1983 | Duck et al. ............... | 350/96.18 |
| 4,580,873 A | 4/1986 | Levinson ................... | 350/96.2 |
| 4,989,932 A | 2/1991 | Landa et al. ............... | 350/96.1 |
| 5,481,631 A | 1/1996 | Cahill et al. .................. | 385/18 |
| 5,841,917 A | 11/1998 | Jungerman et al. ........... | 385/17 |
| 5,960,132 A | 9/1999 | Lin .............................. | 385/18 |
| 6,009,219 A | 12/1999 | Doyle .......................... | 385/23 |
| 6,259,835 B1 * | 7/2001 | Jing .............................. | 385/18 |
| 6,275,626 B1 * | 8/2001 | Laor .............................. | 385/18 |

FOREIGN PATENT DOCUMENTS

| | | | |
|---|---|---|---|
| DE | 31 47 873 A | 12/1981 | ............ G02B/5/176 |
| DE | 31 47 874 A | 12/1981 | ............ G02B/5/176 |
| DE | 34 39 905 A | 10/1984 | ............ G02B/6/00 |
| FR | 2 581 204 | 4/1985 | ............ G02B/6/34 |
| JP | 55 84903 | 6/1980 | ............ G02B/5/14 |
| JP | 58 72108 | 4/1983 | ............ G02B/5/14 |
| JP | 4 216291 | 8/1992 | ............ H04Q/3/52 |

* cited by examiner

Primary Examiner—Phan T. H. Palmer
(74) Attorney, Agent, or Firm—Allen, Dyer, Doppelt, Milbrath & Gilchrist, P.A.

(57) ABSTRACT

The fiber optic switch includes a plurality of optical inputs and a plurality of optical outputs carried by a support. The switch also includes a first plurality of rotatable reflectors each being associated with a respective optical input, and a second plurality of rotatable reflectors each being associated with a respective optical output. Also, a plurality of reflector drivers directs selected pairs of the first and second plurality of rotatable reflectors to define respective paths between the optical inputs and the optical outputs. The free-space propagating optical beam that is transferred between each input and output is formed by a micro lens producing a substantially collimated beam and therefore minimizing optical performance penalties due to the relative path length differences between various routing paths.

27 Claims, 2 Drawing Sheets

FIBER OPTIC SWITCH AND ASSOCIATED METHODS

FIELD OF THE INVENTION

The present invention relates to fiber optic communications, and more particularly, to an optical switching device for switching an optical signal in a fiber optic communication system between two or more channels.

BACKGROUND OF THE INVENTION

Fiber optic cables are used to carry voice, video, and other data signals transmitted as light beams in communications networks. Similar to communication networks using copper wire as the carrier for electronic signals, fiber optic cable lines are interconnected to each other through switches positioned at various locations throughout the communications network. To achieve all-optical routing and rerouting of the communications signals, optical matrix switches or M×N crossbar switches are used. All-optical switches should not to be confused with other switching technologies that first convert the optical signals to electrical signals, perform the required routing, and then convert the electrical signals back to optical signals.

As an example of an all-optical switch, U.S. Pat. No. 6,009,219 to Doyle entitled "Optical Beam Switching Device" discloses an optical switching apparatus that uses a solid refractive switching body for selectively coupling first and second optical channels. The solid refractive switching body is moved to position first and second refractive faces adjacent the first and second optical channels.

Another example is U.S. Pat. No. 5,960,132 to Lin entitled "Fiber-Optic Free-Space Micromachined Matrix Switches". Here, an optical switch includes reflective panels which either permit the light beam to travel in a first direction or redirect the light beam from the first direction to a second direction.

However, conventional fiber optic switches may have a low channel density, high insertion loss, static state power consumption and may be relatively bulky. Switching speed, reliability, wavelength range, and cost are other factors that may also be considered depending on the specific application. In particular, the use of wavelength division multiplexing (WDM) is severely straining the capability of conventional switch technology due to the vast increase in the number of channels; and currently no single switch technology is emerging as optimum for all applications. Thus, there is a need for a fiber optic switch with an increase in channel density, a reduced wavelength dependence, a reduction in size, lower insertion loss, higher reliability, and reduced static power consumption.

SUMMARY OF THE INVENTION

In view of the foregoing background, it is therefore an object of the invention to increase the channel density, wavelength independence, and reliability of an all-optical fiber optic switch while reducing the insertion loss, size and power consumption thereof.

This and other objects, features and advantages in accordance with the present invention are provided by a fiber optic switch including a plurality of optical inputs and a plurality of optical outputs carried by a support. The switch includes a first plurality of rotatable reflectors each being associated with a respective optical input, and a second plurality of rotatable reflectors each being associated with a respective optical output. Also, a plurality of reflector drivers directs selected pairs of the first and second plurality of rotatable reflectors to define respective paths between the optical inputs and the optical outputs.

Each of the plurality of optical inputs and outputs may comprise a lens, an optical connector and an optical fiber. For compactness and good performance the lens may be a gradient index micro lens, although a broader range of wavelength operability may be realized with specifically designed achromatic micro lenses. In any case, the optical input and output lenses are substantially indistinguishable and tailored by manufacture to efficiently transfer a substantially collimated beam of light between the two lenses. The invention takes great advantage of the fact that free-space propagating optical beams may cross paths without interference. Also, each of the first and second plurality of rotatable reflectors may comprise a rotatable mirror, and each of the plurality of reflector drivers may comprise a motor, such as a micro-electro-mechanical (MEMs) motor for compactness. The ultimate compactness of the invention is primarily limited only by the size of the motors that rotate the mirrors, which may vary over time with the state of motor technology. Also, latchable motors may reduce or eliminate the need for electrical power consumption during static operation. The switch may also include a controller for controlling the plurality of reflector drivers to produce desired routing paths between optical inputs and outputs.

The plurality of optical inputs and outputs are preferably positioned on the support in a substantially circular pattern. The support may comprise a first support portion for supporting the plurality of optical inputs in a substantially semi-circular pattern, and a second support portion, adjacent the first support portion, for supporting the plurality of optical outputs in a substantially semi-circular pattern.

Objects, features and advantages in accordance with the present invention are also provided by a method of routing light signals in a fiber optic communication system including a plurality of optical inputs and a plurality of optical outputs. The method includes providing a plurality of rotatable reflectors each being associated with a respective one of the plurality of optical inputs and outputs, and directing pairs of rotatable reflectors to define respective paths between the optical inputs and the optical outputs.

Directing respective rotatable reflectors may comprise rotating the rotatable reflectors with a motor, and the plurality of rotatable reflectors are preferably positioned in a substantially circular pattern. Providing the plurality of rotatable reflectors may comprise positioning the rotatable reflectors associated with the plurality of optical inputs in a substantially semi-circular pattern, and positioning the rotatable reflectors associated with the plurality of optical outputs in a substantially semi-circular pattern adjacent to the rotatable reflectors associated with the optical inputs.

The fiber optic switch and method of the present invention provide an increase in channel density, a reduction in the size, lower insertion loss, a broad range of wavelength performance, higher reliability, and a reduction in static power consumption.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
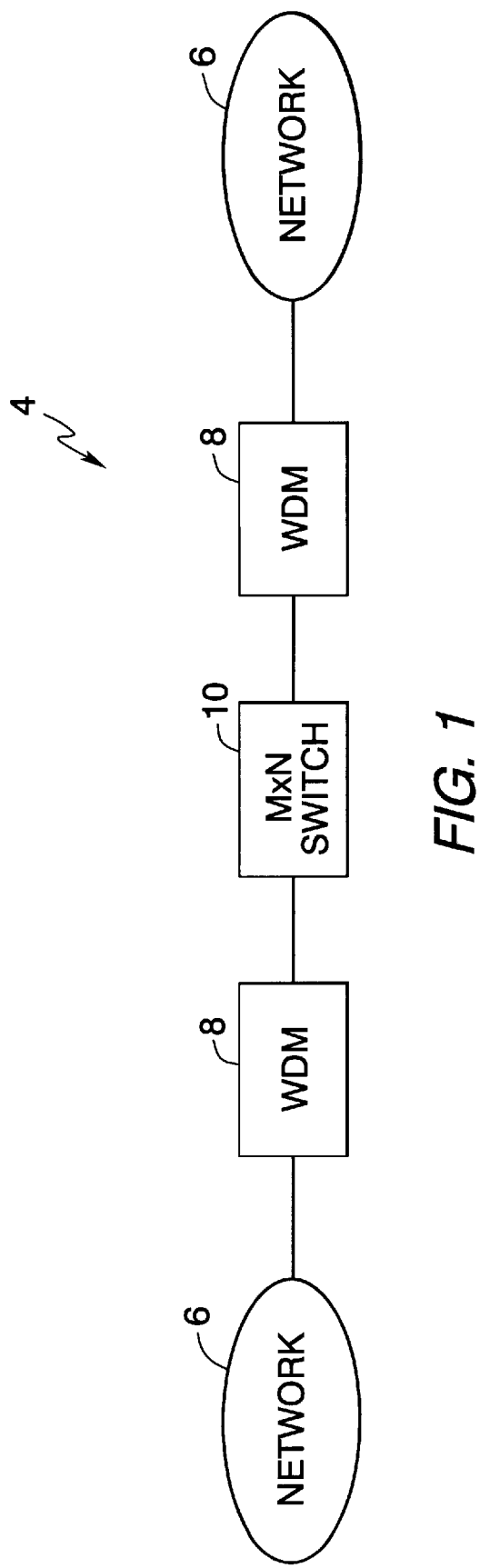
FIG. 1 is a schematic diagram of an optical communication system including a fiber optic switch in accordance with the present invention.
Figure 2:
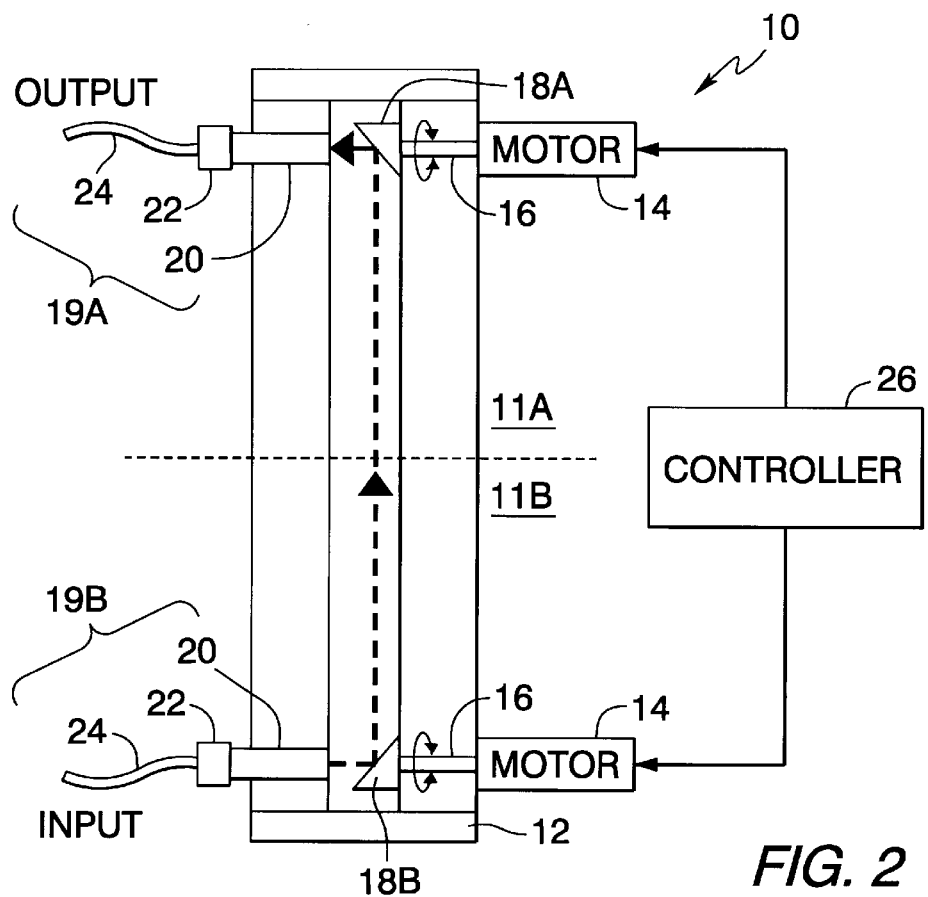
FIG. 2 is a cross-sectional schematic diagram illustrating the fiber optic switch in accordance with the present invention.
Figure 3:
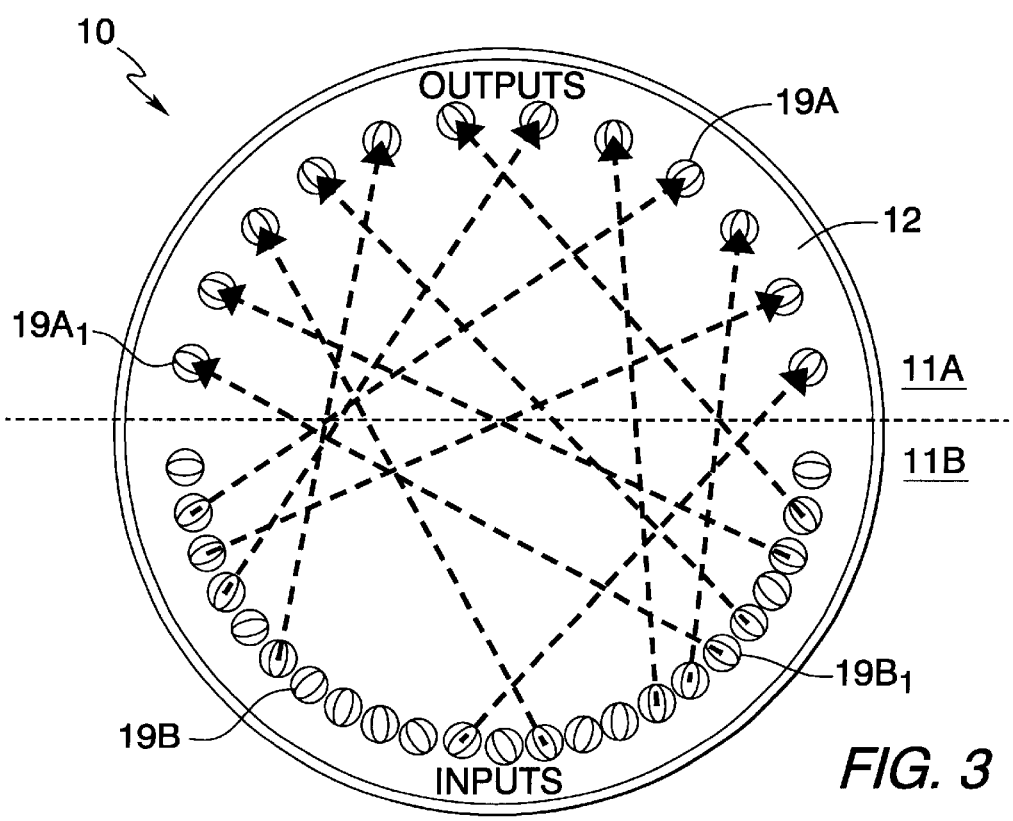
FIG. 3 is schematic diagram illustrating the pattern of fiber optic channels of the fiber optic switch of FIG. 2.

Referring to FIG. 1, an optical communication system 4 includes networks 6 being generally (but not exclusively) connected for mutual communication via a plurality of wavelength division multiplexers (WDMs) 8 and an M×N fiber optic switch 10. Referring now to FIGS. 2 and 3, the fiber optic switch 10 in accordance with the present invention will be described. The fiber optic switch 10 is an all-optical matrix switch or M×N crossbar switch for use in such fiber optic communication systems 4. The switch 10 includes a support or frame 12 for supporting a plurality of optical outputs 19A, and a plurality of optical inputs 19B. The support may include a first support portion 11A for supporting the plurality of optical outputs 19A in a semi-circular pattern, and a second support portion 11B for supporting the plurality of optical inputs 19B in a preferred semi-circular pattern adjacent the plurality of optical inputs. As such, the plurality of optical inputs and outputs are arranged in a preferred substantially circular pattern as shown to minimize the variation in path distances and to improve the line-of-sight between all possible routings. This in turn serves to maximize the number of channels that may be connected via the fiber optic switch 10 and thereby increase the channel density thereof. Other patterns, such as a substantially linear pattern, may also be used depending on the requirements of a specific application.

Each of the optical outputs 19A and inputs 19B may include a collimating micro lens 20, an optical connector 22, and a fiber optic cable 24. The lenses 20, connectors 22 and cables 24 are well known to the skilled artisan. Preferably, the lenses 20 are gradient index (GRIN) micro-lenses which are widely used in fiber optic components such as switches, splitters, isolators, WDMs, and circulators as would be appreciated by the skilled artisan. For compactness and good performance the lenses 20 may be a gradient index micro lens, although a broader range of wavelength operability may be realized with specifically designed achromatic micro lenses. In any case, the optical input and output lenses 20 are substantially indistinguishable and tailored by manufacture to efficiently transfer a substantially collimated beam of light between the two lenses. The invention takes great advantage of the fact that free-space propagating optical beams may cross paths without interference.

The switch 10 also includes a first plurality of rotatable reflectors 18A each being associated with one of the plurality of optical outputs 19A, and a second plurality of rotatable reflectors 18B each being associated with one of the plurality of optical inputs 19B. The rotatable reflectors 18A and 18B are preferably mirrors as would be appreciated by the skilled artisan. The rotatable reflectors 18A and 18B are driven by motors 14 via drive shafts 16. For simplicity, the reflectors 18A and 18B may be formed by beveling, polishing, and depositing a highly reflective layer to the shaft 16 of the motor 14 itself. The motors 14 may be stepper motors and/or the rotatable reflectors 18A and 18B may include a position locating mechanism (e.g. a detent or stop) to aid in the control of the rotatable reflectors. The motors 14 may also be micro-electromechanical system (MEMS) motors to further reduce the size of the switch 10. The motors 14 are directed by a controller 26 to rotate selected pairs of the reflectors 18A and 18B and direct light in a desired direction to define respective routing paths between the optical outputs 19A and the optical inputs 19B.

For example, as can be seen in FIG. 3, a path may be defined between an optical output $19A_1$ and a optical input $19B_1$ by directing respective reflectors 18A and 18B at each other. A light signal may be transmitted through the optical fiber 24, the optical connector 22 and the lens 20 of the optical inputs $19B_1$. Then the light signal is reflected by the associated rotatable reflector 18B towards another rotatable reflector 18A of the desired optical output $19A_1$. The reflector 18A reflects the light signal towards the lens 20 and through the optical connector 22 and the fiber optic cable 24 of the optical output $19A_1$. As a reflector 18A, 18B rotates, the associated free-space optical beam path so swept in space defines a unique plane. By such beam paths associated with all rotating reflectors 18A, 18B subscribing to the identical plane within allowed manufacturing tolerances, all possible combinations of optical input and output paths are therefore provided. The above description refers to inputs and outputs; however, the skilled artisan would appreciate that it may be possible to transmit light signals in either direction and thus the terms may be interchangeable and are not intended to limit the direction of the light signal transmissions.

As an input optical signal is rerouted within this switch 10, the collimated optical beam will generally sweep across several of the second plurality of reflectors 18A associated with outputs. The concern of unwanted optical coupling, or crosstalk, to other outputs during this operation is substantially negated by the high directional selectivity of the micro lenses 20 that couple light from the output reflectors 18A into the associated output fiber 24. Therefore, re-routing may be performed arbitrarily with regard to the location and quantity of paths being configured and without regard of interference to paths remaining static.

The fiber optic switch 10 as described above has increased channel density and a corresponding reduction in size, better performance with higher reliability, and reduced static power consumption.

A method of routing light signals in a fiber optic communication system in accordance with the present invention will now be described. The fiber optic communication system includes a plurality of optical outputs 19A and a plurality of optical inputs 19B. The method includes providing a plurality of rotatable reflectors 18A and 18B each being associated with one of the respective optical outputs 19A and inputs 19B, and directing pairs of rotatable reflectors to define respective paths between the optical inputs and the optical outputs. In other words, as described in the example above, a light signal is transmitted through one of the plurality of optical inputs 19B, reflected by an associated rotatable reflector 18B towards a desired rotatable reflector 18A, and then reflected to the respective one of the plurality of optical outputs 19A.

Directing respective rotatable reflectors 18A and 18B may include rotating the rotatable reflectors with a motor 14 via shaft 16. Also, the plurality of rotatable reflectors 18A and 18B are preferably, but not necessarily, positioned in a substantially circular pattern. For example, the rotatable reflectors 18A associated with the plurality of optical outputs 19A may be positioned in a substantially semi-circular pattern, and the rotatable reflectors 18B associated with the plurality of optical inputs 19B may be positioned in a substantially semi-circular pattern adjacent to the rotatable reflectors associated with the optical outputs. As mentioned above, the number of outputs 19A and inputs 19B that may be connected via the fiber optic switch 10 is maximized and the channel density of the switch is thereby increased.

The described method of the present invention provides an increase in channel density, a reduction in the size of the switch 10, better performance with higher reliability, and reduced static power consumption.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fiber optic switch comprising:
   a support;
   a plurality of optical inputs carried by the support;
   a plurality of optical outputs carried by the support;
   a first plurality of rotatable reflectors, each being associated with a respective optical input;
   a second plurality of rotatable reflectors each being associated with a respective optical output; and
   a plurality of reflector drivers for directing pairs of the first and second plurality of rotatable reflectors to define respective paths between the optical inputs and the optical outputs;
   the first and second pluralities of rotatable reflectors being rotatable about respective axes being transverse to the respective paths between the optical inputs and the optical outputs.

2. A fiber optic switch according to claim 1 wherein each of the optical inputs and outputs comprises a lens and an optical connector.

3. A fiber optic switch according to claim 2 wherein each of the optical inputs and outputs further comprises an optical fiber.

4. A fiber optic switch according to claim 2 wherein the lens comprises a collimating micro-lens.

5. A fiber optic switch according to claim 1 wherein each of the first and second plurality of rotatable reflectors comprises a rotatable mirror.

6. A fiber optic switch according to claim 1 wherein each of the plurality of reflector drivers comprises a motor.

7. A fiber optic switch according to claim 6 wherein the motor comprises a micro-electro-mechanical system (MEMS) motor.

8. A fiber optic switch according to claim 1 further comprising a controller for controlling the plurality of reflector drivers.

9. A fiber optic switch according to claim 1 wherein the optical inputs and outputs are carried by the support in a substantially circular pattern.

10. A fiber optic switch according to claim 9 wherein the support is substantially circular.

11. A fiber optic switch according to claim 1 wherein the support comprises:
    a first support portion for supporting the plurality of optical inputs in a substantially semi-circular pattern; and
    a second support portion, adjacent the first support portion, for supporting the plurality of optical outputs in a substantially semi-circular pattern.

12. A fiber optic switch comprising:
    a plurality of optical inputs;
    a plurality of optical outputs;
    a support for supporting the plurality of optical inputs and the plurality of optical outputs in a substantially circular pattern;
    a plurality of rotatable reflectors each being associated with one of the respective optical inputs and outputs;
    a plurality of reflector drivers for directing pairs of the first and second plurality of rotatable reflectors to define respective paths between the optical inputs and the optical outputs; and
    a controller for controlling the plurality of reflector drivers.

13. A fiber optic switch according to claim 12 wherein each of the optical inputs and outputs comprises a lens and an optical connector.

14. A fiber optic switch according to claim 13 wherein each of the optical inputs and outputs further comprises an optical fiber.

15. A fiber optic switch according to claim 13 wherein the lens comprises a collimating micro-lens.

16. A fiber optic switch according to claim 12 wherein each of the plurality of rotatable reflectors comprises a rotatable mirror.

17. A fiber optic switch according to claim 12 wherein each of the plurality of reflector drivers comprises a motor.

18. A fiber optic switch according to claim 17 wherein the motor comprises a micro-electro-mechanical system (MEMS) motor.

19. A fiber optic switch according to claim 12 wherein the support comprises:
    a first support portion for supporting the plurality of optical inputs in a substantially semi-circular pattern; and
    a second support portion, adjacent the first support portion, for supporting the plurality of optical outputs in a substantially semi-circular pattern.

20. A method of routing light signals in a fiber optic communication system including a plurality of optical inputs and a plurality of optical outputs, the method comprising:
    providing a plurality of rotatable reflectors each being associated with one of the respective optical inputs and outputs; and
    directing pairs of rotatable reflectors towards one another to define respective paths between the optical inputs and optical outputs;
    the plurality of rotatable reflectors being rotatable about respective axes being transverse to the respective paths between the optical inputs and the optical outputs.

21. A method according to claim 20 wherein directing respective rotatable reflectors comprises rotating the rotatable reflectors with a motor.

22. A method according to claim 21 wherein the motor comprises a micro-electro-mechanical system (MEMS) motor.

23. A method according to claim 20 wherein providing the plurality of rotatable reflectors comprises positioning the plurality of rotatable reflectors in a substantially circular pattern.

24. A method according to claim 20 wherein providing the plurality of rotatable reflectors comprises:
    positioning the rotatable reflectors associated with the plurality of optical inputs in a substantially semi-circular pattern; and positioning the rotatable reflectors associated with the plurality of optical outputs in a substantially semi-circular pattern adjacent to the rotatable reflectors associated with the plurality of optical inputs.

25. A method according to claim 20 wherein each of the plurality of optical inputs and outputs comprises a lens, an optical connector, and an optical fiber.

26. A method according to claim 25 wherein the lens comprises a collimating micro-lens.

27. A method according to claim 20 wherein each of the plurality of rotatable reflectors comprises a rotatable mirror.

* * * * *